United States Patent [19]

Derman

[11] 4,384,724
[45] May 24, 1983

[54] SEALING DEVICE

[76] Inventor: Karl G. E. Derman, Sorgardsvagen 7, S-443 Partille, Sweden

[21] Appl. No.: 220,238

[22] Filed: Dec. 23, 1980

Related U.S. Application Data

[63] Continuation-in-part of Ser. No. 935,337, Aug. 17, 1978, abandoned, which is a continuation-in-part of Ser. No. 792,535, May 2, 1977, abandoned, which is a continuation of Ser. No. 305,084, Nov. 9, 1972, abandoned.

[51] Int. Cl.³ .............................................. F16J 15/00
[52] U.S. Cl. .................................... 277/3; 277/15; 277/59; 277/75; 277/134
[58] Field of Search ................... 277/3, 15, 34, 75, 59

[56] References Cited

U.S. PATENT DOCUMENTS

| | | | |
|---|---|---|---|
| 3,478,648 | 11/1969 | D'Alba | 277/15 |
| 3,578,342 | 5/1971 | Satterthwaite | 277/34 |
| 3,614,111 | 10/1971 | Regan | 277/34 |
| 3,740,057 | 6/1973 | Doyle et al. | 277/59 |
| 3,815,926 | 6/1974 | Vore | 277/75 |
| 4,146,237 | 3/1979 | Bergman | 277/3 |

Primary Examiner—Robert I. Smith

[57] ABSTRACT

A sealing device for separating two areas from each other positioned in spaces at each side of an opening defined by and between two parts movable in relation to each other and wherein a sealing element sealingly engages one of the parts, and a pressure device for supplying a fluid to a clearance space between a surface of the other of the parts and a surface of the sealing element to move the surface of the sealing element to provide a clearance space which is dependent on the elasticity of the sealing element and the pressure of fluid supplied to the clearance space.

3 Claims, 9 Drawing Figures

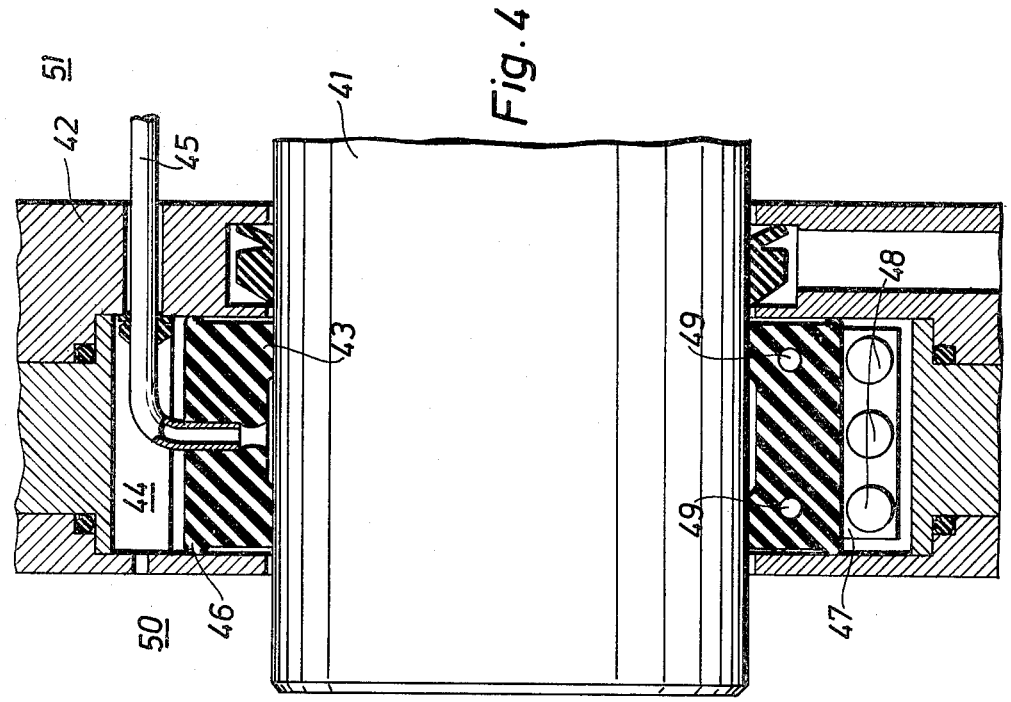
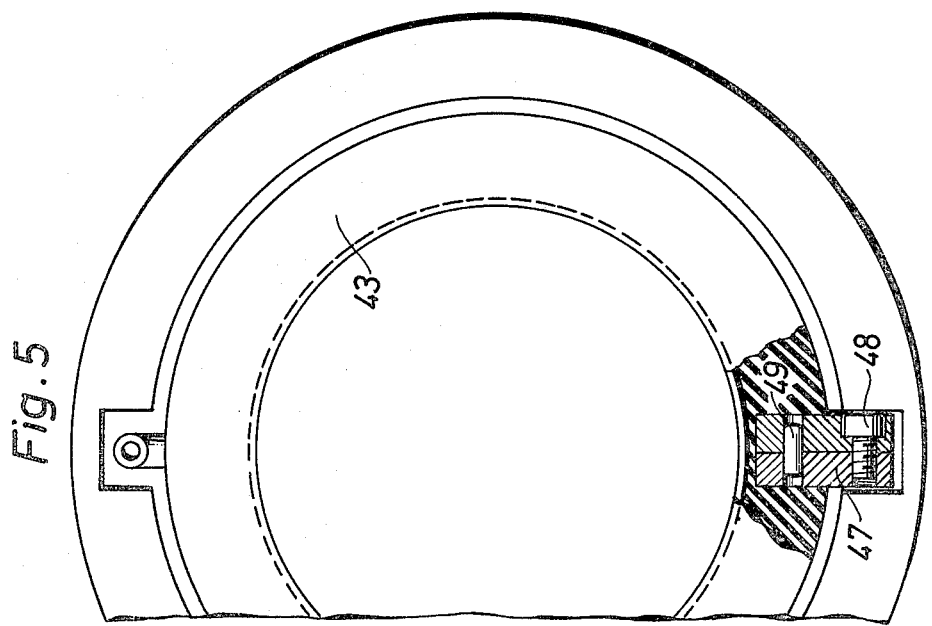

SEALING DEVICE

CROSS REFERENCE TO RELATED APPLICATIONS

This application is a Continuation-In-Part of my co-pending application Ser. No. 935,337 filed Aug. 17, 1978, which in turn was a Continuation-In-Part of application Ser. No. 792,535 filed May 2, 1977, which in turn was a Continuation of Ser. No. 305,084 filed Nov. 9, 1972 all of which are now abandoned.

BACKGROUND OF THE INVENTION

The present invention relates to a sealing device.

Sealing arrangements for shafts and other movable elements operating in polluted atmosphere containing abrasive particles and similar sealing arrangements requiring an absolutely reliable separation of two spaces from each other are complicated and expensive. Sealing arrangements of this kind often comprise hard metal rings sliding against each other and constituting the sealing elements. These rings are very expensive, and they also cause a great loss of power. Different types of stuffing boxes are also used. The drawbacks of these boxes are high power consumption, requirement for cooling, and wearing of the shaft which has to be protected by means of an expensive wearing sleeve. Thus, all sealing arrangements for the complicated sealing cases have the common drawback of being very expensive.

Thus, the object of the present invention is to provide a sealing device which is simple and cheap to manufacture and operate and is very efficient.

SUMMARY OF THE INVENTION

In accordance with the invention there is provided a device for separating two mediums from each other positioned in spaces at each side of an opening defined by and between two elements movable in relation to each other, comprising a sealing element sealingly engaging one of said elements and a device for supplying a fluid to a clearance space between a surface of the other of said elements and a surface of the sealing element, said fluid having a pressure higher than the pressure of the mediums in said spaces, and at least a portion of the sealing element forming said surface consisting of an elastic material, so that said surface of said sealing element is movable for determining the width of said clearance space dependent on at least the elasticity of said portion and the pressure of said fluid supplied to said clearance space.

In a sealing arrangement in which said elements consist of a shaft and a wall having an opening through which the shaft extends, the sealing element consists of a sleeve of an elastic material, preferably a rubber sleeve.

The invention is described in the following with reference to the accompanying drawings.

BRIEF DESCRIPTION OF THE DRAWING

FIGS. 4 and 5 are a section and an end view, respectively, of a further embodiment of the invention;

DESCRIPTION OF THE PREFERRED EMBODIMENT

Figure 1:
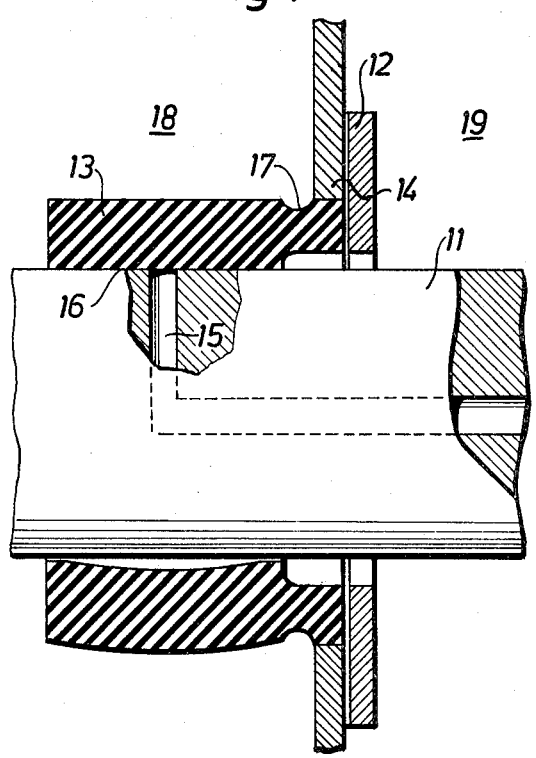
FIG. 1 is an axial section through a sealing arrangement between a stationary shaft and a rotatable wall, the upper portion of the figure showing the position of a sealing element in a stationary position of the wall and the lower portion of the figure showing the position of the sealing element when the wall rotates.

In FIG. 1 reference numeral 11 relates to a stationary shaft extending through a rotatable wall 12. The shaft is surrounded by a rubber sleeve 13 which is at one end fixed to a flange 14 in turn fixed to the wall 12. A channel 15 extends through the shaft to the interface 16 between the shaft and the rubber sleeve. A pressure fluid can be supplied to said surface 16 through the channel 15. When the wall is stationary, there is normally no supply of pressure fluid to the surface 16. When no pressure fluid is supplied, the rubber sleeve contacts the shaft, as shown in the upper portion of FIG. 1, providing for a sufficient sealing between the spaces at each side of the wall. When the wall 12 is rotated, the pressure fluid is supplied to the surface 16 separating the rubber sleeve 13 from the shaft, as shown in a somewhat exaggerated way in the lower portion of FIG. 1. The rubber sleeve bulges at the central portion and forms at its end very thin clearances through which the pressure fluid flows. The flow of the fluid is the same at both ends independently of the pressures of the mediums in the spaces at each side of the wall. The rubber sleeve is perfectly centered around the shaft with the same clearance around the whole shaft. However, this requires that the rubber sleeve is so arranged that it is substantially free for motion in the radial direction. In the embodiment of FIG. 1 this is provided by means of a reduced portion 17 of the rubber sleeve in the vicinity of the portion thereof fixed to the flange 14. In operation the rubber sleeve does not contact the shaft and the sealing arrangement works substantially without friction. The pressure is determined so that the pressure fluid can lift the sleeve from the shaft. Because of the fact that the clearance spaces can be very thin the amounts of pressure fluid flowing through the clearance spaces are very small. The pressure fluid can be air, water, oil or any other suitable fluid.

As mentioned the sealing arrangement according to the invention is favorable especially when the sealing arrangement is positioned in the wall between two spaces containing mediums of different pressures. In the space 18 where the sleeve 13 is positioned there is a pressure $P_1$, which is higher than the pressure $P_2$ at the other side of the wall 12. Thus, the elasticity of the rubber ring is supported by the pressure $P_1$ of the medium surrounding the sleeve 13. When the channel 15 is supplied with a pressure fluid having a pressure $P_3$ which is higher than the pressure $P_1$, the sleeve 13 is separated from the shaft so that a certain amount of the pressure fluid continuously flows in to the spaces 18 and 19. This prevents a mixing of the mediums in the spaces 18 and 19 at the same time making the sealing arrangement frictionless. In the case of a liquid as the pressure fluid it is preferred to collect the fluid flowing out from the clearance spaces and return the fluid to the pressure source as described with reference to the embodiments of FIGS. 4 and 5. As rubber is an elastic material, the rubber sleeve will form around the shaft, making it possible to take up deviations of the shaft from the absolutely circular shape. Also other irregularities can be taken up by the rubber sleeve and do not adversely affect the sealing action. It is also possible to move the shaft in the axial direction in relation to the sealing wall without affecting the sealing action. Thus, the sealing arrangement according to the invention is very insensitive to dimensional deviations.

Figure 2:
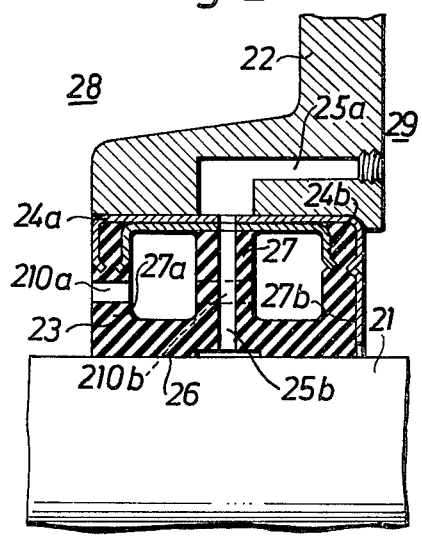
FIG. 2 is a section of the upper portion of second embodiment of a sealing arrangement in accordance with the invention.

In FIG. 2 there is shown another sealing arrangement according to the invention. The rubber sleeve 23 is provided with three flange portions, a central portion 27 and end portions 27a and 27b. The rubber sleeve is fixed by means of two sheet metal rings 24a and 24b and constitutes together therewith a unit which is mounted in a wall 22 and surrounds a shaft 21. The wall 22 separates two spaces 28 and 29. In the wall there is a channel 25a connected with a channel 25b extending through the flange 27. In the flange 27a there is provided an opening 210a corresponding to an opening 210b in the central flange portion 27. In the relaxed position the rubber sleeve 23 has a greater inner diameter than the diameter of the shaft 21. The required sealing contact between the rubber sleeve and the shaft in the stationary position of the arrangement is provided by exerting a pressure on the sleeve through the channels 210a and 210b. The pressure exerted through the channels 25a and 25b is supplied to the contact surfaces between the rubber sleeve 23 and the shaft 21 and originates from the same source. The pressure is chosen so high that the sleeve will lift from the shaft. The advantage of this arrangement is that if the pressure source fails, the sealing sleeve is not destroyed as it loses its contact with the shaft when the pressure is relieved.

Figure 3:
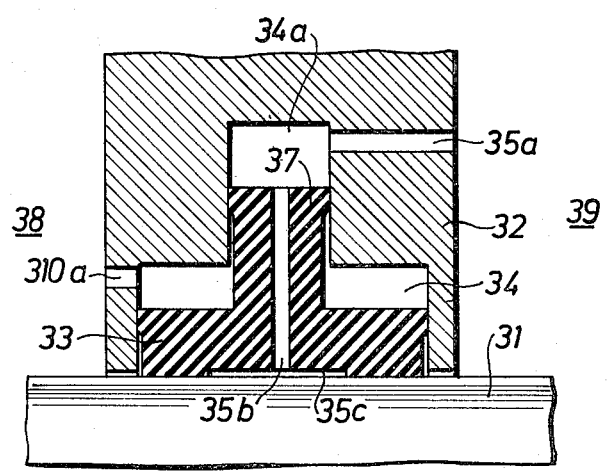
FIG. 3 is a section of a third embodiment.

In FIG. 3 there is shown a rotatable shaft 31 extending through a sealing wall 32 separating two spaces 38 and 39. In the sealing wall 32 there is provided a groove which is somewhat narrower than a rubber sleeve 33 having a projecting flange 37 positioned in a depressed portion 34a of the groove 34. The rubber sleeve 33 as well as the groove 34, 34a have a T-shaped section. The rubber sleeve 33 and the groove 34 define three annular spaces. Thereby the ring can be shifted in a radial direction. A pressure fluid can be supplied to a very thin, annular clearance space 35c between the rubber sleeve 33 and the shaft 31 through a channel 35a ending in the groove 34 and a channel 35b. If the pressure of the pressure fluid is higher than the pressure in the space 38 which, through opening 310a in the sealing wall and an opening similar to 210b in the flange, respectively, is transferred to the outer side of the sleeve, the rubber sleeve is lifted from the shaft in the same way as described above.

The shaft 41 shown in FIGS. 4 and 5 extends through a wall 42 separating two spaces 50 and 51 containing a liquid and air, respectively. The liquid must not flow out from the space 50. However, water can be allowed to flow into the space. The shaft rotates at high rotational speed and the periphery speed in the sealing surfaces between the shaft and the sealing arrangement positioned in the wall is about 30 meters per second. In conventional sealing arrangements the loss of effect is several horse powers. In the sealing arrangement shown in FIGS. 4 and 5 the loss is substantially none. A rubber sleeve 43 is positioned in a groove 44 in the wall 42. The sleeve is positioned on the shaft 41 at a slight prestressing. An angle pipe 45 having one angle portion introduced into the sleeve extends through the wall into the groove 44. The other angle portion of the pipe is sealed by means of a V-shaped sealing ring allowing a shifting motion of the pipe with maintained sealing action.

Water having a pressure somewhat higher than the pressure in the space 50 is supplied to the surface between the rubber sleeve and the shaft 41 through the pipe 45. The rubber sleeve is lifted from the shaft, and as it is free for motion in the radial direction the sleeve will float around the shaft. A small amount of water will flow out from the ends of the sleeve. The end surfaces of the rubber sleeve are at the outer periphery provided with annular projections 46 constituting static sealings which are pressed against the inner sides of the groove 44.

For constructional reasons it can be necessary to use a separated or slitted rubber sleeve 43. FIGS. 4 and 5 show a slitted ring which been jointed together after being positioned on the shaft. It is very important that a joint of this kind is absolutely tight and free from all defects, i.e. jacks and loose rubber particles.

In order to provide an absolutely perfect joint the sleeve can be manufactured in the following way. Between two metal rods 47 there is positioned a sheet metal portion. The metal rods are bolted together by means of bolts 48, and the relative position of the rods is determined by means of two guiding pins 49. The metal rods 47 so bolted together are placed in a mold in which the rubber sleeve is molded. The bolts 48, the sheet metal portion and the guiding pins 49 are removed, and the rubber sleeve is slitted by means of a knife introduced betwen the metal rods. After the rubber sleeve has been positioned around the shaft the metal rods 47 are bolted together using the guiding pins 49 but not the sheet metal portion. The normal shrinking of the rubber by the vulcanization thereof is compensated by removing the sheet metal portion.

Figure 6:
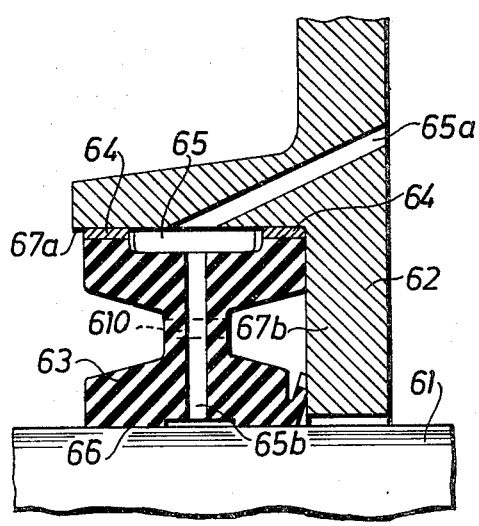
FIGS. 6, 7 and 8 are sections of three further embodiments of the invention.

The embodiment of FIG. 6 differs insignificantly from the sealing arrangements described above. The rubber sleeve 63 has an X-shaped section. The wall 62 through which the shaft 61 extends is provided with a groove defined by a cylindrical surface 67a and a flat surface 67b. The rubber sleeve is reinforced by means of two metal rings 64 pressed into the groove to sealing contact with the surface 67a. Between the metal rings 64 there is formed an annular distribution channel 65 which is connected with a pressure fluid source through a channel 65a in the wall. The pressure fluid is also conducted through a channel 65b formed in the rubber sleeve to the contact surface 66 between the rubber sleeve and the shaft. A channel 610 is formed in the rubber sleeve in order to provide the same outer pressure around the sleeve portion of the rubber ring as the pressure in the space surrounding the shaft.

The above embodiments of the invention comprise a rubber sleeve having two integral sleeve portions. With regard to the function this is not necessary. The sleeve portions can be replaced by two separate rubber sleeves 73a, 73b, see FIG. 7. The rubber sleeves are positioned in two grooves 74a, 74b. The pressure fluid is introduced between the rubber sleeves through a channel 75 formed in the wall 72. In this arrangement the shaft 71 is allowed to have different diameters at the point of sealing.

Figure 7:
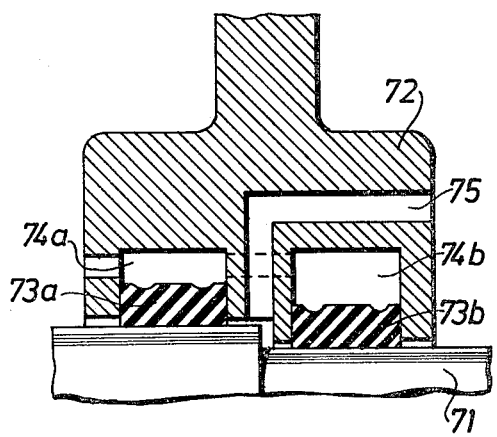
Figure 8:
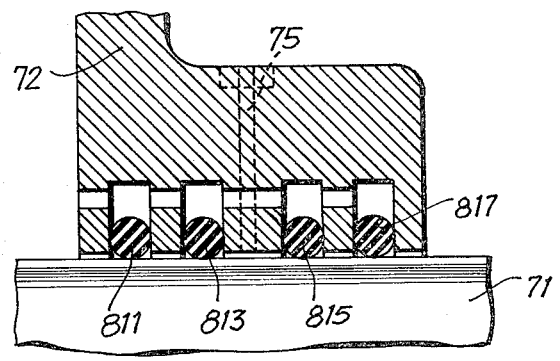

FIG. 8 shows an embodiment of the invention similar to the embodiment of FIG. 7. The difference residing in the fact that the rubber sleeves 73 and 73b have been replaced by O-rings 811, 813, 815 and 817 of which there may be twice as many as the number of sleeves.

Figure 9:
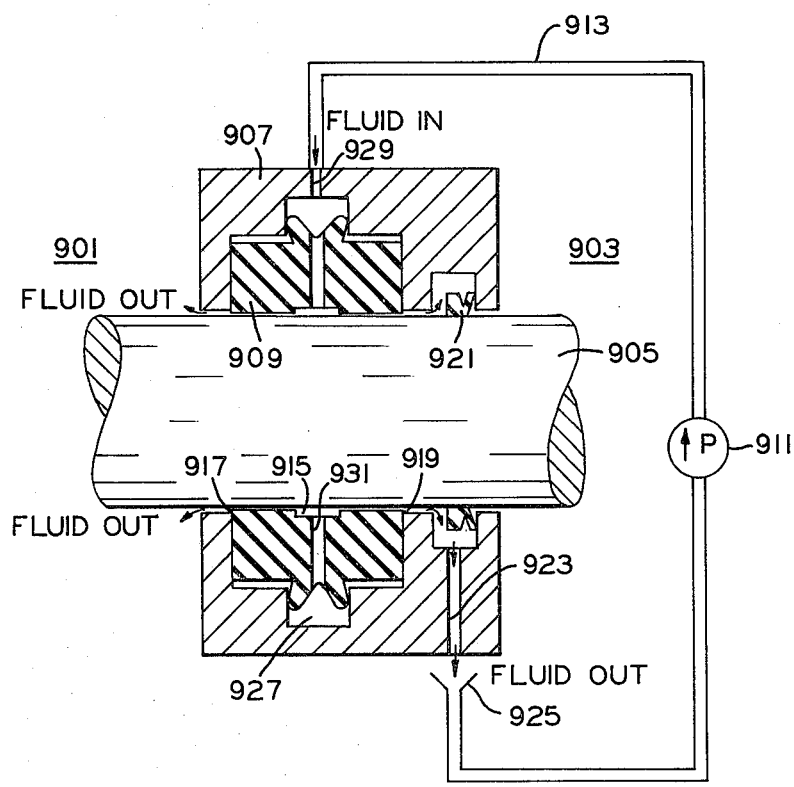
FIG. 9 is a section of another embodiment combining features from FIGS. 3 and 4.

In FIG. 9, the device separates mediums in regions 901 and 903 from one another. As in some of the previous embodiments, shaft 905 is movable relative to another element 907, such as a wall, and the device includes sealing element 909, which sealingly engages the wall. A continuous flow of fluid, such as water under pressure, is supplied from pump 911 by way of conduit 913 to a clearance space 915 intermediate the sealing element ends 917 and 919 between the shaft surface and the inner surface of the sealing element 909. The fluid is supplied at a pressure higher than the pressure of at least the medium in region 901. As before, the sealing element is made of an elastic material which in its unstressed state has an inner diameter which is smaller than the diameter of the shaft 905 so that when the sealing element is positioned on the shaft as illustrated, the sealing element is slightly prestressed to form around and make sealing contact with the shaft 905, with the surface of the sealing element 909 movable radially for determining the width of the clearance space 915 in response to at least the elasticity of the sealing element and the pressure of the fluid supplied to the clearance space. When fluid under pressure is supplied and the shaft 905 is in motion relative to the other element 907, the continuously flowing pressurized fluid separates the sealing element from the shaft surface a substantially uniform distance in a radial direction to maintain complete and radially uniform floating separation between the sealing element and the shaft with fluid flowing in both directions from the clearance space and out ends 917 and 919 into at least the lower pressure medium area 901 with the entire inner surface of the seal lifted from the shaft surface providing a low friction seal. Thus the fluid supplied to the sealing element intermediate the ends thereof must flow through a narrow annular region of substantial length before it flows out into the spaces at each side of the sealing element. It is very important that the clearance spaces be of a substantial length in the axial direction to provide extremely good stability of the sealing device. This substantial length should be several times as great as the radial separation between the shaft and seal during operation. Preferably this length is about one order of magnitude greater than the operating radial separation.

A second sealing element 921 displaced laterally along the shaft 905 from the sealing element 909 surrounds and sealingly engages the shaft and also sealingly engages the other element 907. A fluid outlet 923 in element 907 and intermediate the second sealing element 921 and the sealing element 909 allows the egress of fluid from the clearance space toward the second sealing element to be diverted to a generally radial direction and this egressing fluid may be collected as at 925 for recirculation if desired. Sealing element 909 is disposed in an annular groove 927 in element 907 and the element 907 which may be a wall between the media includes an inlet channel 929 extending from an external surface of element 907 to the annular groove 927. The sealing element 909 includes a channel 931 which extends from the annular groove 927 to the clearance space 915 to provide a fluid passing connection between the inlet channel 929 and the sealing element channel 931.

The invention can be modified within the scope of the following claims.

What is claimed is:

1. A device for separating two mediums from each other, the mediums being contained in two spaces at each side of a shaft opening defined between a shaft element and another element movable in relation to each other, the another element including an annular groove, the device comprising in combination with said shaft element and said another element, a sealing element disposed in the annular groove and sealingly engaging the said another one of said relatively movable elements, and means for supplying a continuous flow of fluid under pressure to an annular clearance space completely surrounding the shaft and intermediate the sealing element ends between one surface of the shaft and one surface of the sealing element at a pressure higher than the pressure of at least one of the mediums in the respective medium space, the means for supplying fluid including an inlet channel in the another element extending from an external surface of the another element to the annular groove, and at least one channel in the sealing element extending from the annular groove to the clearance space, the annular groove providing a fluid passing connection between the inlet channel and the at least one channel and in which at least a portion of the sealing element provided with said sealing element surface is an elastic material which in its unstressed state has an inner diameter which is smaller than the shaft diameter so that when the sealing element is positioned on the shaft the sealing element is slightly prestressd to form around and make sealing contact with the shaft along a substantial axial distance thereof so that said surface of said sealing element is movable radially for determining the width of the clearance space in response to at least the elasticity of said portion of the sealing element and the pressure of the fluid supplied to the clearance space whereby when the means for supplying fluid under pressure is operative and the two elements are in relative motion, the continuously flowing fluid under pressure to said clearance space will separate the sealing element from the said shaft a substantially uniform distance in a radial direction and for a substantial distance in the axial direction including the end portions of the sealing element to maintain complete and radially uniform floating separation between the said one surface of the said shaft and the said one surface of the sealing element with fluid flowing in both directions through a narrow space of substantial length from the clearance space and out into at least the lower pressure medium so that the entire inner surface of the seal is lifted from the said one surface of the shaft to thereby provide a low friction seal, a second sealing element displaced laterally along the shaft from the said sealing element, surrounding and sealingly engaging the shaft and sealingly engaging the another element, and a fluid outlet in the another element intermediate the second sealing element and the said sealing element for collecting fluid flowing from the clearance space toward the second element, the narrow space of substantial length in the axial direction being several times as great in the axial direction as it is in the radial direction.

2. The device as claimed in claim 1 wherein the fluid is water, the water egressing the clearance space at opposed seal ends in opposed axial directions and the second sealing element diverting the water flow to a generally radial direction along the fluid outlet.

3. The device as claimed in claim 1 wherein the axial direction length of the narrow space is about one order of magnitude greater than the uniform radial separation distance.

* * * * *